United States Patent
Taylor

(10) Patent No.: US 7,294,169 B2
(45) Date of Patent: Nov. 13, 2007

(54) ELECTRICAL ENHANCEMENT OF FABRIC FILTER PERFORMANCE

(75) Inventor: Robert W. Taylor, Overland Park, KS (US)

(73) Assignee: General Electric Company, Schenectady, NY (US)

( * ) Notice: Subject to any disclaimer, the term of this patent is extended or adjusted under 35 U.S.C. 154(b) by 86 days.

(21) Appl. No.: 11/257,582

(22) Filed: Oct. 25, 2005

(65) Prior Publication Data

US 2007/0089602 A1  Apr. 26, 2007

(51) Int. Cl.
*B03C 3/74* (2006.01)
*B03C 3/80* (2006.01)

(52) U.S. Cl. .............. 95/2; 55/282; 55/302; 95/19; 95/20; 95/59; 95/68; 95/74; 96/18; 96/30; 96/31; 96/50

(58) Field of Classification Search ............ 95/2, 95/19–21, 59, 68, 74; 96/18, 30, 31, 50; 55/282, 302

See application file for complete search history.

(56) References Cited

U.S. PATENT DOCUMENTS

| | | | |
|---|---|---|---|
| 2,490,979 A * | 12/1949 | Palmer | 96/31 |
| 2,917,130 A | 12/1959 | Powers | |
| 3,577,705 A * | 5/1971 | Sharlit | 95/2 |
| 3,724,174 A | 4/1973 | Walkenhorst | |
| 3,966,435 A | 6/1976 | Penney | |
| 4,098,591 A | 7/1978 | van Diepenbroek et al. | |
| 4,259,707 A | 3/1981 | Penney | |
| 4,692,174 A | 9/1987 | Gelfand et al. | |
| 4,749,386 A | 6/1988 | Strohmeyer et al. | |
| 4,904,283 A | 2/1990 | Hovis et al. | |
| 4,931,073 A | 6/1990 | Miller et al. | |
| 5,024,681 A | 6/1991 | Chang | |
| 5,034,030 A | 7/1991 | Miller et al. | |
| 5,158,580 A | 10/1992 | Chang | |
| 5,217,511 A | 6/1993 | Plaks et al. | |
| 5,474,599 A | 12/1995 | Cheney et al. | |
| 5,527,569 A | 6/1996 | Hobson et al. | |
| 5,647,890 A * | 7/1997 | Yamamoto | 95/69 |
| 5,770,273 A | 6/1998 | Offer et al. | |
| 5,833,736 A | 11/1998 | Durham et al. | |

(Continued)

FOREIGN PATENT DOCUMENTS

GP  398724 A  9/1933

OTHER PUBLICATIONS

Portions of the Max-9 Website; BHA Group, Inc. Webpage; Copyright 1995-2005 General Electric Company; 9 sheets.

(Continued)

*Primary Examiner*—Richard L. Chiesa
(74) *Attorney, Agent, or Firm*—Armstrong Teasdale, LLP

(57) ABSTRACT

A method for operating a filter assembly having a filter medium includes applying a constant or nearly constant static DC potential to dust entering the filter assembly and the filter medium, passing dust-laden gas through the filter medium in a first direction through the filter assembly while the filter medium is statically charged with the DC potential, measuring pressure drop through the filter assembly, and, in response to the pressure drop meeting a preset limit, reversing the polarity of the DC potential to thereby allow dust particles on the filter medium to drop off the filter medium.

19 Claims, 1 Drawing Sheet

U.S. PATENT DOCUMENTS

| | | | |
|---|---|---|---|
| 5,837,017 A * | 11/1998 | Santschi et al. | 55/302 |
| 5,855,649 A | 1/1999 | Durham et al. | |
| 5,938,818 A | 8/1999 | Miller | |
| 5,961,693 A | 10/1999 | Altman et al. | |
| 6,096,118 A | 8/2000 | Altman et al. | |
| 6,428,697 B1 | 8/2002 | Edgar | |
| 6,514,315 B1 | 2/2003 | Chang | |
| 6,544,317 B2 | 4/2003 | Miller | |
| 6,660,061 B2 * | 12/2003 | Josephson et al. | 95/2 |
| 7,001,447 B1 * | 2/2006 | Altman et al. | 95/74 |
| 2002/0134237 A1 * | 9/2002 | Miller | 95/63 |
| 2003/0000384 A1 | 1/2003 | Tomimatsu et al. | |
| 2003/0037675 A1 | 2/2003 | Gillingham et al. | |

OTHER PUBLICATIONS

EP Search Report, App. No. 06255451.4 (Jan. 17, 2007).

* cited by examiner

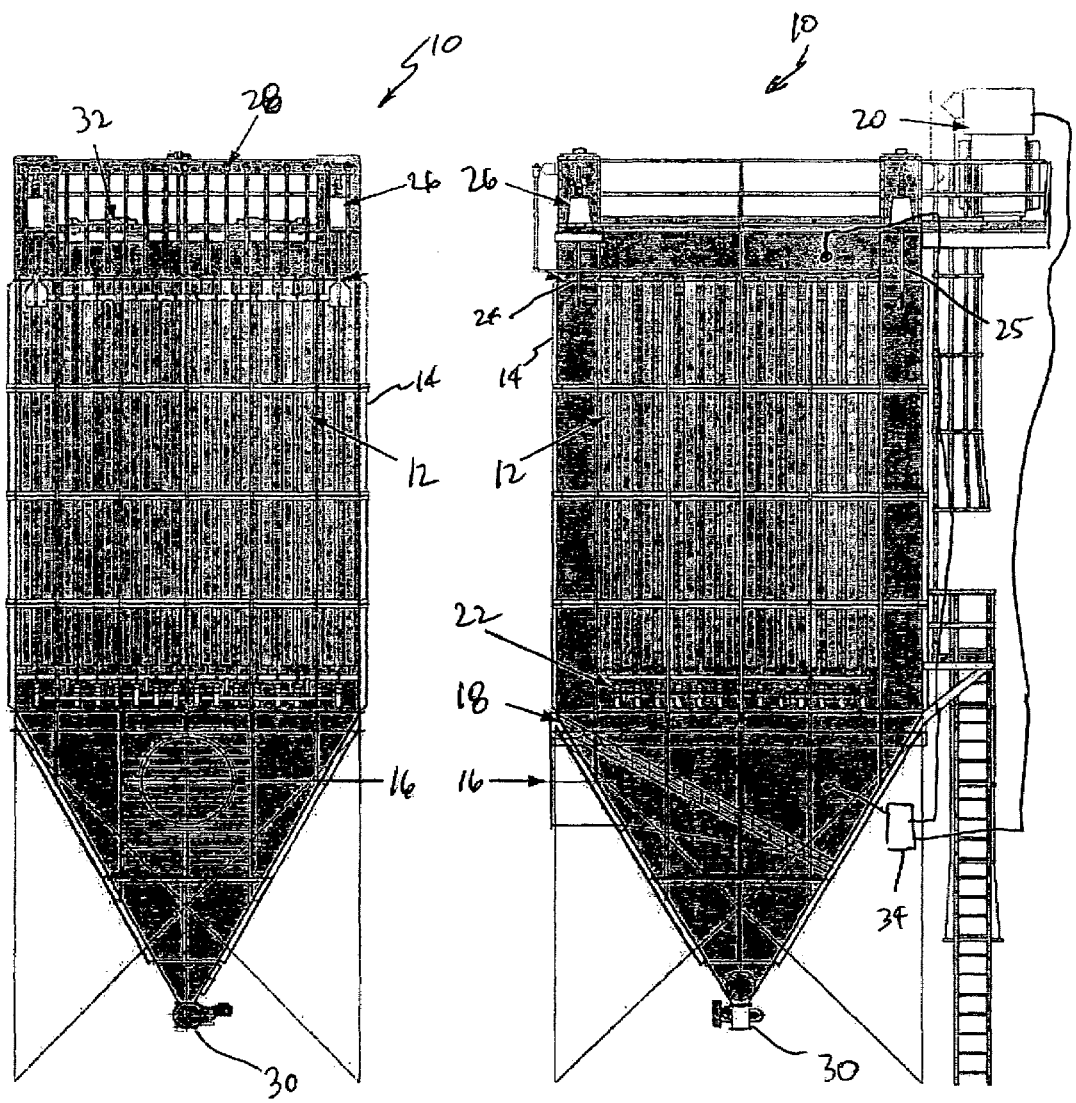

US 7,294,169 B2

ELECTRICAL ENHANCEMENT OF FABRIC FILTER PERFORMANCE

BACKGROUND OF THE INVENTION

This invention relates generally to methods and apparatus for enhancing fabric filter performance, and more particularly to electrically charged fabric filter performance.

At least one known ESFF (electrostatic fabric filter) configuration (e.g., Max-9™, available from BHA Group, Inc., Kansas City, Mo.) offers a variety of configurations that can be adapted to existing plants. These filter configurations utilize a high air-to-cloth ratio, so it is relatively easy to fit into a cramped plant environment. These filter configurations are also easily retro-fitted into existing environments.

In some known configurations, the polarity of a charging field on an ESFF bag house is reversed to facilitate cleaning of the filter bags. A sufficient amount of cleaning air at a suitable pressure enters the outlet of the filter bag or element. The flow of air reverses gas flow through the bag and shocks the cloth, resulting in particulate matter being dislodged from the surface of the fabric filter.

In ESFF, all particles entering the bag house are charged with a negative corona, causing all particles to migrate to the positive end of the filter bag. In many known configurations, air pulse cleaning is used. Air pulse cleaning, however, is not necessarily completely effective in removing all charged dust particles from a filter bag. Some particles tend to cling to the filter as a result of electrical charges.

The common polarity of dust particles accumulating on the surface of the filter bag can result in a porous cake. "Like" charged particles repel one another on the filter bag, creating interstitial passages through which gas can freely flow. As the dust layer increases in thickness the pressure drop increases. When pressure drop reaches a pre-set upper limit, a pulse cleaning cycle must be initiated by directing a blast of compressed air into the throat of the filter bag where clean gas exits. The compressed air reverses flow of gas through the inside of the filter causing dust to be force off the external surface of the bag. This shock causes the dust layer to diminish in thickness reducing pressure drop. The process of pulse cleaning occurs on a cyclical basis to maintain system pressure drop within an acceptable range.

The cleaning process introduces fatigue and wear in the filter bag. As a result, bag life is dependent on the number of cleaning cycles experienced and the pressure of the air utilized.

The high voltages that are applied to filters also carries with it a potential for sparking. Sparking can burn holes in filter bags, from which may result immediate increases in dust emissions. Fabric filters are designed to minimize the propensity for sparks to occur, but in known filter configurations, the waveform from the transformer rectifier power supply is negative pulsed DC, which produces a series of half cycle waves. To achieve an average voltage of 35 kV, which is used in many ESFF configurations, a peak voltage of about 42 kV to 48 kV must be realized. It is thus necessary to design the filter to withstand at least this high peak voltage, plus an additional margin of safety.

BRIEF DESCRIPTION OF THE INVENTION

Some aspects of the present invention therefore provide a method for operating a filter assembly having a filter medium. The method includes applying a constant or nearly constant static DC potential to entering dust and the filter medium, passing dust-laden gas through the filter medium in a first direction through the filter assembly while the filter medium is statically charged with the DC potential, measuring pressure drop through the filter assembly, and, in response to the pressure drop meeting a preset limit, reversing the polarity of the DC potential to thereby allow dust particles on the filter medium to drop off the filter medium.

Another aspect of the present invention provides a filter apparatus that has a cloth filter medium configured to pass dust-laden gas in a first direction while the filter medium is statically charged with a constant or nearly constant DC potential. The filter apparatus also includes a pressure drop measuring apparatus configured to measure a pressure drop during operation of the filter apparatus, and a DC source configured to apply the DC potential to the cloth filter medium and responsive to the pressure drop measuring apparatus to reverse the polarity of the DC potential to thereby allow dust particles on the filter medium to drop off the filter medium when the pressure drop meets or exceeds a preset limit.

It will thus be appreciated that various configurations of the present invention provide the combined advantages of low pressure drop and high particulate removal efficiency, and can simplify filter design by operating at lower peak DC voltages for the same filtering effectiveness. The manner in which these and additional advantages are obtained is described in more detail below.

BRIEF DESCRIPTION OF THE DRAWINGS

FIG. 1 is an internal front view of an exemplary configuration of the present invention.

FIG. 2 is an internal side view of the configuration of FIG. 1.

DETAILED DESCRIPTION OF THE INVENTION

In some configurations of the present invention and referring to FIGS. 1 and 2, a electrostatic fabric filter (ESFF) apparatus 10 comprises a medium of a cloth filter or filter medium 12 (e.g., pleated cartridge or a conventional bag filter) in a housing 14. A gas inlet 16 allows dust-laden gas to pass through filter medium 12 in a first direction (upward) directed by inlet baffle 18 while filter medium 12 is statically charged by high voltage/rectifier set 20 using discharge electrodes and tensioning weights 22 and electrodes 24 and 25. High voltage system support insulators 26 are provided to insolate electrodes 24 and 25 from housing 14. In some, but not all configurations, purge gas system manifolds and headers 28 are provided along with a valve 30 to allow reverse pulsing of filter medium 12 using a source of compressed gas (not shown) to cause dust particles to drop off filter medium 12. Some, but not all configurations also provide an acoustic cleaner 32 that further facilitates the cleaning of filter media 12. A pressure drop measuring apparatus 34 measures a pressure drop across filter medium 12 when ESFF apparatus 10 is in use.

In some configurations of the present invention, high voltage/rectifier set 20 comprises a DC source that provides a constant or nearly constant DC potential, as opposed to known configurations that apply a pulsed DC potential. The DC potential supplied in some configurations is approximately 35 kV, which, because the voltage is constant or nearly constant DC, is equal to the peak potential. However, a potential of 35 kV provides a filtering equivalent of a peak voltage of about 42 kV to 48 kV of pulsating DC as used in currently known filter configurations. DC source 20 also is configured in some configurations to supply a current to filter medium 12 that results in a current of about 6 to 10 microamperes per square foot of filter cloth, which has been found to provide the most effective filtering.

DC source 20 is responsive to pressure drop measuring apparatus 34 to reverse the polarity of the DC potential that is supplied to thereby allow dust particles on filter 12 to drop off filter medium 12 when the pressure drop meets or exceeds a preset limit. In some configurations of the present invention, purge gas system manifolds and headers 28 and valve 30 are either not supplied or are not used to pulse clean the filter medium. In such configurations, the polarity of the DC potential is reversed without reverse pulsing the filter medium with compressed gas, yet adequate removal of dust particles is accomplished without this pulsing. Acoustic cleaners 32 are optional and also need not be supplied and/or used.

In some configurations of the present invention, a method for operating a filter assembly 10 having a filter medium 12. The method includes applying a constant or nearly constant static DC potential to filter medium 12, passing dust-laden gas through filter medium 12 in a first direction through filter assembly 10 while filter medium 12 and dust entering filter assembly 10 are statically charged with the DC potential, measuring pressure drop through filter assembly 10, and, in response to the pressure drop meeting a preset limit, reversing the polarity of the DC potential to thereby allow dust particles on filter medium 12 to drop off filter medium 12.

In some configurations, the reversing of the polarity of the DC potential to allow dust particles on filter medium 12 to drop off the filter medium is performed without reverse pulsing the filter medium with compressed gas. Also, in some configurations, filter media 12 is a filter bag.

Some method configurations of the present invention are performed repeatedly, and the DC potential can be approximately 35 kV in some configurations. Particles in the gas to be filtered are thus charged with a negative corona. The static DC potential applied to the filter medium in some configurations results in a current of about six to ten microamperes per square foot of filter medium.

Configurations of the present invention can be used to replace a filter assembly 10 with another filter assembly 10. For example, a first filter assembly can be used initially, followed by replacement with a second filter assembly having a different configuration. For example, in some configurations in which a second filter assembly used as a replacement for a first filter assembly, a method comprises, prior to replacement of the first filter assembly with the second filter assembly, passing dust-laden gas through filter medium of the first filter assembly, and reverse pulsing the filter media of the first filter assembly with compressed gas to clean collected dust from the filter media of the first filter assembly. After replacement of the first filter assembly 10 with a second filter assembly 10 configuration of the present invention, the method includes applying a constant or nearly constant static DC potential to filter medium 12, passing dust-laden gas through filter medium 12 in a first direction through filter assembly 10 while filter medium 12 is statically charged with the DC potential, measuring pressure drop through filter assembly 10, and, in response to the pressure drop meeting a preset limit, reversing the polarity of the DC potential to thereby allow dust particles on filter medium 12 to drop off filter medium 12.

In some configurations in which a filter assembly 10 is replaced, the reversing the polarity of the DC potential to thereby allow dust particles on filter medium 12 of the second filter assembly to drop off the filter medium of the second filter assembly is performed while reverse pulsing the second filter medium, but using a lower pressure than the reverse pulsing the filter medium of the first filter assembly. Also, in some configurations, the second filter assembly comprises a higher permeability filter fabric than the first filter assembly, and/or the second filter assembly is physically smaller than the first filter assembly.

In some replacement filter configurations, reversing the polarity of the DC potential to thereby allow dust particles on the filter medium of the second filter assembly to drop off the filter medium of the second filter assembly is performed without reverse pulsing the filter medium of the second filter assembly. The DC potential on the second filter assembly can be approximately 35 kV, and/or a DC potential can be applied that results in a current of about six to ten microamps per square foot of filter cloth. In addition, in some configurations, a pulsating DC potential is applied to the filter medium of the first filter while passing dust-laden gas therethrough.

Field test data has been obtained that shows that low pressure drop and high particulate removal efficiency benefits derived from the presence of a electrical field near the filter bags occur within a specific range of current densities. The field data shows peak benefits are derived when the current density reaches a value in the range of six to ten micro-amps per square foot of filter cloth.

By using constant or nearly constant DC voltage, sufficient current density is generated to achieve desired benefits without sparking, and the high peak to average voltage ratio power supply allows reduced internal clearances within filter assembly 10.

A pulsed DC power supply provides dynamic field strength on the surface of the dust layer. The porosity of the dust cake is determined by the electrical field strength applied to the filter bag. Field strength varies with every half cycle. By contrast, configurations of the present invention utilize a DC or near DC wave form that generates a consistent field strength. As a result, system pressure drop is more stable.

In addition, some configurations of the present invention can operate at particle removal efficiencies significantly greater compared to a conventional pulse jet filter due to the presence of the electrical field. The layer of charged particles on the surface of the filter bag repels additional particles, preventing them from passing through the filter. As the field strength varies, so does the particle removal efficiency. Particle removal efficiency is lowest when the electrical field is turned off, highest when the electrical field is turned on. The use of a consistent electrical field strength results in consistent particle removal efficiencies. The ability to reduce the number of cleaning cycles increases the life of a filter bag.

Also, in configurations in which a compressed gas pulse is replaced by a rapid change in the polarity of the electrical field, the negative electrical field would collapse then quickly be replaced with a positive electrical field. Dust remains negatively charged for a short period of time, so it is repulsed from the surface of the filter bag. The field is then reversed back to the negative polarity field. Using a polarity reversal to clean the filter bags allows pulse cleaning pressure to be reduced or eliminated totally, thereby extending the life of filter bags. Additionally, using a polarity reversal to clean as opposed to using compressed gas reduces the potential for dust to pass through the filter barrier.

The ability to reduce the amount of dust permeating the filter cloth during cleaning allows more permeable fabrics to be utilized. Fabric permeability defines the minimum pressure drop at which a filter bag house can operate. Increasing fabric permeability reduces baseline pressure drop. Reverse polarity cleaning allows use of higher permeability fabrics without experiencing an increase in dust emissions. Thus system pressure drop levels lower than conventional permeability fabrics can be achieved.

Using reverse polarity to clean allows the use of high or higher air-to-cloth ratios than in known filter configurations. Thus, fewer filter bags and smaller casings can be used. Also, offsetting increased pulse cleaning cycles with reverse polarity cleaning would increase bag life and allow operation at higher air to cloth ratios.

Utilization of DC or near DC power supplies minimizes or eliminates sparking which can result in bag failure and leakage, and reduces the internal clearances necessary to avoid sparking to ground, allowing for use of a smaller casing. Also, a more stable electrical field can be obtained, and a consistent field strength applied to the dust layer provides improved dust collection efficiencies.

Reverse polarity cleaning allows a filter bag house to operate at higher air to cloth ratios compared to conventional units, thereby allowing new or replacement filter apparatus to be physically smaller than a pulse jet filter apparatus handling comparable gas volume.

Reverse polarity cleaning also allows use of higher permeability fabrics without increasing dust emissions, resulting in lower system pressure drop.

It will thus be appreciated that some configurations of the present invention facilitate gas pulse cleaning or even eliminate the need for such by reversing the polarity of the field during cleaning. This reversal causes charged dust particles that otherwise would remain attached to the surface of the filter bag to be dislodged, resulting in lowered operating cost and reduced bag wear.

While the invention has been described in terms of various specific embodiments, those skilled in the art will recognize that the invention can be practiced with modification within the spirit and scope of the claims.

What is claimed is:

1. A method for operating a filter assembly having a cloth fabric filter medium, said method comprising:
   applying a constant or nearly constant static DC potential to dust entering the filter assembly and to the filter medium;
   passing dust-laden gas through the filter medium in a first direction through the filter assembly while the filter medium is statically charged with the DC potential;
   measuring pressure drop through the filter assembly; and
   in response to the pressure drop meeting a preset limit, reversing the polarity of the DC potential to thereby allow dust particles on the filter medium to drop off the filter medium.

2. A method in accordance with claim 1 wherein said reversing the polarity of the DC potential to thereby allow dust particles on the filter medium to drop off the filter medium is performed without reverse pulsing the filter medium with compressed gas.

3. A method in accordance with claim 1 wherein the filter medium is a filter bag.

4. A method in accordance with claim 1, performed repeatedly.

5. A method in accordance with claim 1, wherein said DC potential is approximately 35 kV.

6. A method in accordance with claim 1, wherein applying a static DC potential to the filter medium comprises applying a DC potential resulting in a current of about six to ten micro-amps per square foot of filter medium.

7. A method in accordance with claim 1 wherein particles in the gas to be filtered are charged with a negative corona.

8. A method in accordance with claim 1, wherein the filter assembly used therein is a second filter assembly used as a replacement for a first filter assembly, and said method further comprises, prior to replacement of the first filter assembly with the second filter assembly:
   passing dust-laden gas through filter medium of the first filter assembly; and
   reverse pulsing the filter medium of the first filter assembly with compressed gas to clean collected dust from the filter medium of the first filter assembly.

9. A method in accordance with claim 8 wherein said reversing the polarity of the DC potential to thereby allow dust particles on filter medium of the second filter assembly to drop off the filter medium of the second filter assembly is performed while reverse pulsing the second filter medium, but using a lower pressure than said reverse pulsing the filter medium of the first filter assembly.

10. A method in accordance with claim 8 wherein the second filter assembly comprises a higher permeability filter fabric than said first filter assembly.

11. A method in accordance with claim 8 wherein the second filter assembly is physically smaller than the first filter assembly.

12. A method in accordance with claim 8 wherein said reversing the polarity of the DC potential to thereby allow dust particles on the filter medium of the second filter assembly to drop off the filter medium of the second filter assembly is performed without reverse pulsing the filter medium of the second filter assembly.

13. A method in accordance with claim 8 wherein said DC potential is approximately 35 kV.

14. A method in accordance with claim 8 wherein applying a static DC potential to the filter medium of the second filter assembly comprises applying a DC potential resulting in a current of about six to ten micro-amps per square foot of filter cloth.

15. A method in accordance with claim 8 further comprising a pulsating DC potential to the filter medium of the first filter while passing dust-laden gas therethrough.

16. A filter apparatus comprising:
    a cloth fabric filter medium configured to pass dust-laden gas therethrough in a first direction while the cloth fabric filter medium is statically charged with a constant or nearly constant DC potential;
    a pressure drop measuring apparatus configured to measure a pressure drop during operation of the filter apparatus; and
    a DC source configured to apply the DC potential to the cloth fabric filter medium and responsive to the pressure drop measuring apparatus to reverse the polarity of the DC potential to thereby allow dust particles on the cloth fabric filter medium to drop off the cloth fabric filter medium when the pressure drop meets or exceeds a preset limit.

17. An apparatus in accordance with claim 16 configured to reverse the polarity of the DC potential without reverse pulsing the cloth fabric filter medium with compressed gas.

18. An apparatus in accordance with claim 16, wherein said DC potential is approximately 35 kV.

19. An apparatus in accordance with claim 16, wherein the DC source is configured to supply a current to the cloth fabric filter medium that results in a current of about six to ten micro-amps per square foot of filter cloth.

* * * * *